(12) United States Patent
Li et al.

(10) Patent No.: US 7,165,162 B2
(45) Date of Patent: Jan. 16, 2007

(54) PARTITIONING MODULES FOR CROSS-MODULE OPTIMIZATION

(75) Inventors: XinLiang David Li, Sunnyvale, CA (US); Shin-Ming Liu, Saratoga, CA (US); Dhruva R. Chakrabarti, Santa Clara, CA (US); Robert Hundt, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 10/756,881

(22) Filed: Jan. 13, 2004

(65) Prior Publication Data

US 2005/0155023 A1 Jul. 14, 2005

(51) Int. Cl.
*G06F 12/06* (2006.01)
(52) U.S. Cl. .................................................. 711/173
(58) Field of Classification Search ................ 711/173, 711/111, 100, 170, 209, 202, 203
See application file for complete search history.

(56) References Cited

U.S. PATENT DOCUMENTS

| 5,740,443 | A * | 4/1998 | Carini ..................... 717/133 |
| 6,179,491 | B1 * | 1/2001 | Choi et al. ................ 717/116 |
| 2003/0226133 | A1 * | 12/2003 | Grover .................... 717/140 |
| 2004/0223941 | A1 * | 11/2004 | Schwartz et al. ....... 424/70.22 |
| 2004/0243554 | A1 * | 12/2004 | Broder et al. .............. 707/3 |

* cited by examiner

*Primary Examiner*—Pierre-Michel Bataille

(57) ABSTRACT

Techniques for partitioning modules into smaller groups are disclosed. In various embodiments, cross-module optimization may be performed on these smaller groups. Further, related modules are grouped together based on a predefined algorithm. Relatedness, or closeness, or affinity, of modules are considered based on various factors including, for example, the number of calls between routines in different modules, possibility of in-lining a first routine in a first module into a second routine in a second module, characteristics of parameters being passed between routines in different modules, etc.

15 Claims, 10 Drawing Sheets

PARTITIONING MODULES FOR CROSS-MODULE OPTIMIZATION

FIELD OF THE INVENTION

The present invention relates generally to cross-module optimization, and, more specifically, to partitioning modules into smaller groups for such optimization.

BACKGROUND OF THE INVENTION

Traditionally, all routines related to a program are partitioned into multiple modules. However, in the single-module-complication approach, each module is compiled independently, and all compiled modules are linked together to form a program. Consequently, at a module's compile time, information in one module is not available to the compiler when compiling another module, and program optimization relies on information limited to individual modules. In a cross-module optimization approach, the compiler performs optimization based on information in modules that are provided as inputs to the compiler. Unfortunately, large programs can include up to ten of thousands of modules, and, in many cases, performing cross-module optimization on a large number of modules exceeds memory limitations. One approach to solve the problem defines a number of "hottest" routines and assigns modules having these routines to one group, and the rest of the modules in another group. However, modeling module relationship in this approach is coarse, resulting in coarse partitions.

SUMMARY OF THE INVENTION

The present invention provides techniques for partitioning modules into smaller groups of modules so that cross-module optimization may be performed on these smaller groups. In various embodiments, related modules are grouped together based on a predefined algorithm. Relatedness, or closeness, or affinity, of modules are considered based on various factors including, for example, the number of calls between routines in different modules, possibility of in-lining a first routine in a first module into a second routine in a second module, characteristics of parameters being passed between routines in different modules, etc. In one aspect, once the modules are partitioned into smaller groups, cross-module optimization may be performed on these groups in parallel, and therefore reduces compile time.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention. Further, unless otherwise specified, terms used in this document have ordinary meaning to those skilled in the art.

OVERVIEW

Figure 1:
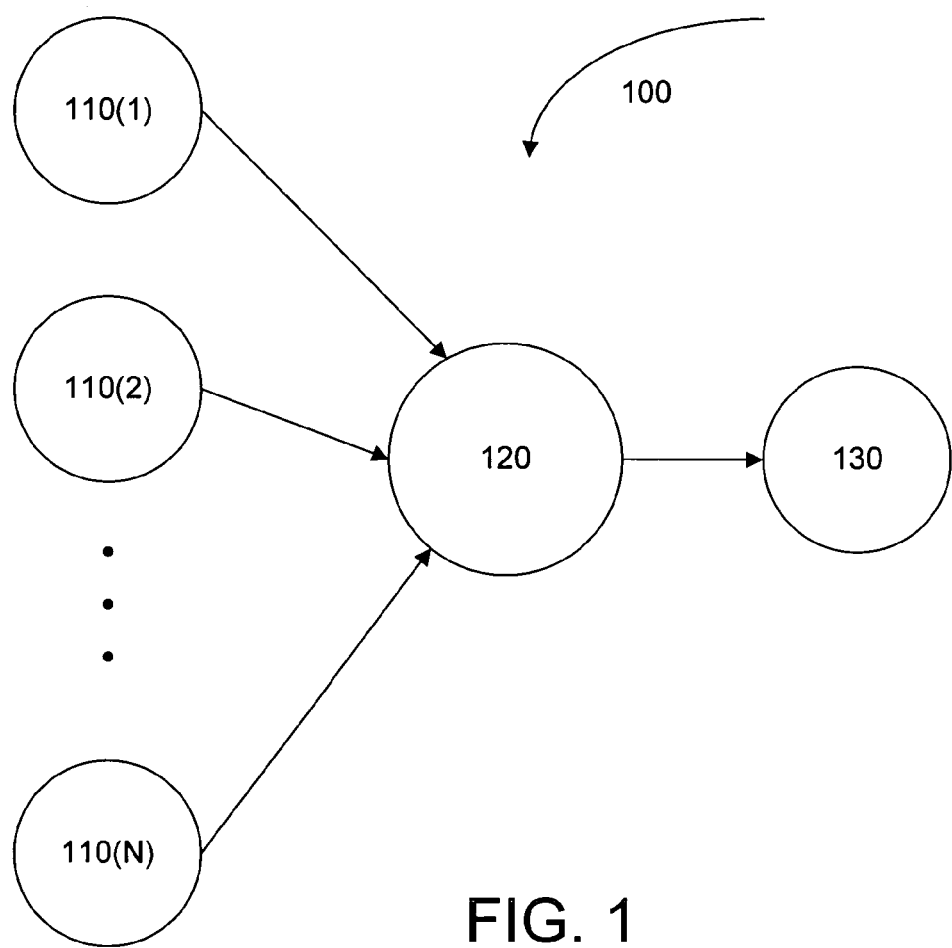
FIG. 1 shows an environment for cross-module optimization, in accordance with an embodiment.

FIG. 1 shows an environment 100 for cross-module optimization, in accordance with an embodiment. Environment 100 includes a plurality of programming modules, e.g., modules 110(1) to 110(N), a compiler 120, and a program 130.

Generally, a module 110 is independently developed and includes various routines of a program, e.g., program 130. The term "routine" refers to a function in the C language, method in the C++ and Java language, procedure in the Pascal language, subroutine in the Fortran language, etc. Normally, a routine performs a task for a program.

Compiler 120 translates source code of programs, such as that of program 130, to object code, object modules, etc. In the embodiment shown in FIG. 1, compiler 120 receives as inputs the plurality of modules 110(1) to 110(N), compiles them and generates the object code for program 130. Compiler 120, during compilation, also performs cross-module optimization for the N modules 110.

In accordance with techniques in various embodiments of the invention, the N modules 110 are partitioned into smaller groups so that optimization can be performed on these smaller groups.

AFFINITY OR RELATIONSHIPS BETWEEN MODULES

Figure 2:
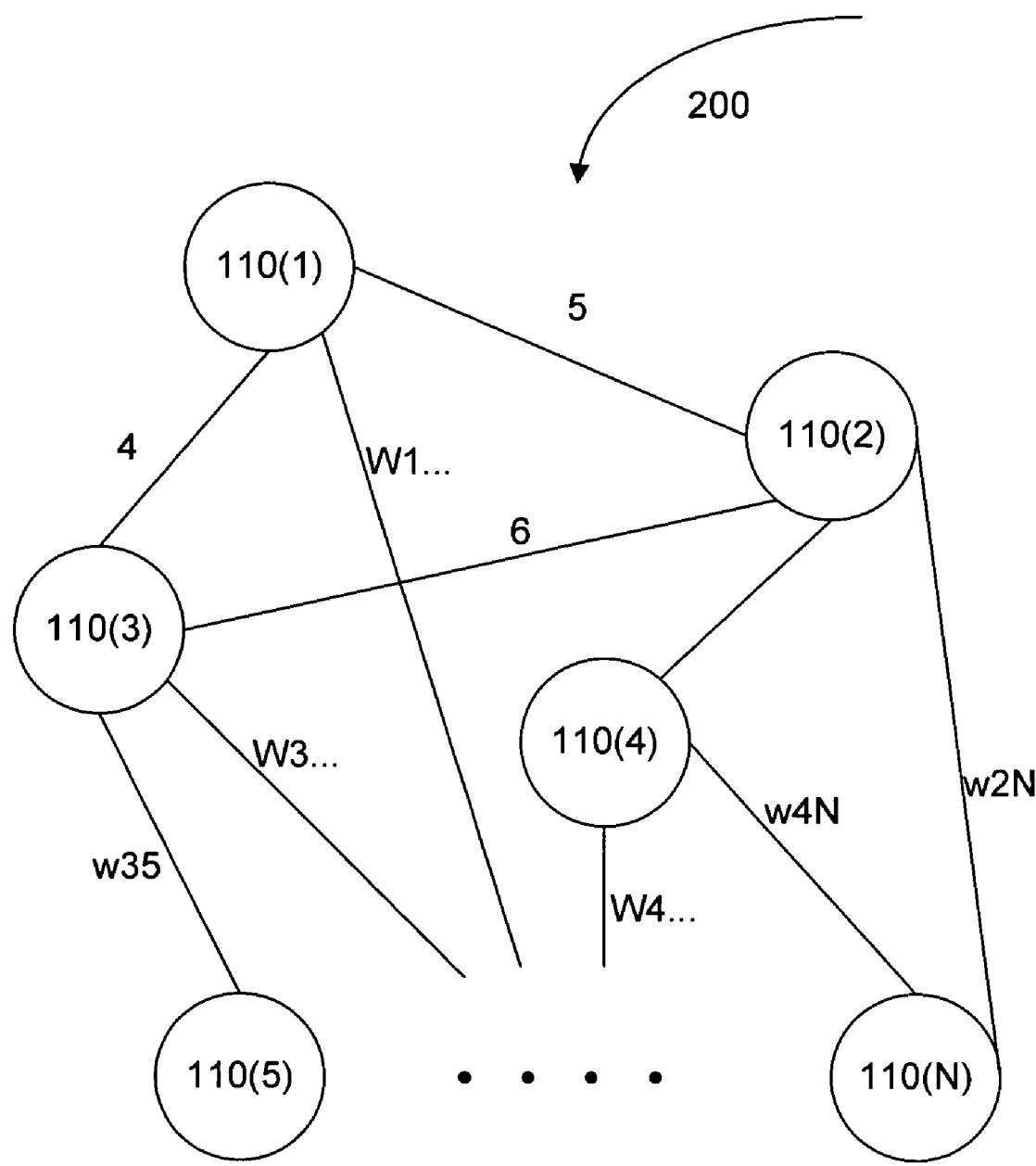
FIG. 2 shows an affinity graph, in accordance with an embodiment.

Various embodiments of the invention group or partition related modules. FIG. 2 shows an affinity graph 200, in accordance with an embodiment. Graph 200 shows the N modules 110, and two modules 110 are "neighbors" or connected by an edge if there are cross-module optimization opportunities between the two modules. Each edge is associated with a value or "weight" indicating the affinity between the two modules connected by that edge. In FIG. 2 and for illustration purposes, the affinity weight between module 110(1) and 110(2) is 5, between module 110(2) and 110(3) is 6, and between module 110(3) and 110(1) is 4, etc. Further, the affinity weights between other modules are shown as $w_{ij}$ for modules 110(i) and 110(j). In various embodiments, two modules having a high affinity weight is more closely related to one another than two modules having a lower affinity weight. As a result, two modules having the highest affinity weight are the most closely related modules. However, embodiments of the invention are not so limited. Different ways expressing the relationship or closeness of modules are within the scope of embodiments of the invention. For example, two modules having a low-affinity weight may be more closely related than another two modules having a higher affinity weight.

In a simple example of three modules, e.g., modules 110(1), 110(2), and 110(3), and if the affinity weights between modules 110(1) and 110(2), 110(1) and 110(3), and 110(2) and 110(3), are 5, 4, and, 6 as shown, then various embodiments of the invention group modules 110(3) and 110(2) together because these two modules have the highest affinity weight.

DETERMINING THE AFFINITY WEIGHTS

In various embodiments, programmers provide the affinity weights based on various factors, including, for example, the number of calls across modules between functions (i.e., inter-module call counts), possibilities for in-lining, code-size considerations, call graph characteristics, frequency of global variables referenced in a module but defined in another module, parameter characteristics for calls from one module to another module, hierarchy of object-oriented programming classes, etc.

Generally, the more number of inter-module call counts, the higher the opportunities for optimization, and therefore the higher the affinity weight.

In-lining refers to the process of copying programming code of a function to be called (the callee) into the function body of the calling function (the caller). In-lining provides good opportunities for optimization, and therefore criteria for cross-module in-lining may be used for determining the affinity weights so that the modules with high probabilities for in-lining may be grouped together. Exemplary good criteria for in-lining include: small-sized callee routines, callee routines with a single caller, callee routines being called numerous times by a caller, callees being called in a loop, call-site parameters having certain good attributes such as constant values, lower height in a call graph, register pressure, etc.

When a function, e.g., function foo( ) in a module, e.g., module 110(1), is called only by another function, e.g., function bar( ) in another module, e.g., module 110(2), it is beneficial to group modules 110(1) and 110(2) together. This is because, for example, if function foo( ) is in-lined into function bar( ), then no other copies of function foo( ) remains in other modules, and the original body of function foo( ) may be eliminated.

Frequencies of global variables referenced in one module, e.g., module 110(1), but defined in another module, e.g., module 110(2) indicate that it is beneficial to group module 110(1) and 110(2) together, and therefore have a high affinity weight. This is because it gives the compiler chances to perform better data cache optimization.

Characteristics of parameters passed between function calls in different modules may be used to determine the affinity weights. For example, cloning may be performed when the value passed to a parameter in the function call is a constant, the parameters are restricted to a range, the parameters are not overlapped, etc. Consequently, modules with parameters having those characteristics are considered related and have a high affinity weight. Cloning refers to creating various versions of programming code, usually in the form of a function, to optimize the function's performance. Generally, one or more versions of a function are created or cloned from the function, and each cloned version performs better if a condition is satisfied. During program compilation, if the condition corresponding to a cloned function is met, then that cloned function, instead of the original function, is invoked, and the program therefore executes better because it runs a better version of the function.

Modules implementing virtual functions of a certain class may be grouped together to enable de-virtualizations, which is a way of optimization that replaces virtual functions with direct calls. For example, in a C++ embodiment, two classes D1 and D2 are derived from a base class B that defines a virtual function foo( ) and the definition of class B is overridden by the virtual function foo( ) defined in class D1 and D2. Further, if a variable b is a pointer to the class B, but the dynamic type of the object pointed to by b is D1, then it might be beneficial to assign the module that defines D1::foo( ) and the module that invokes b→foo( ) in the same group. This is because after de-virtualization, there is a chance to further inline the call to D1::foo( ).

In various embodiments, the affinity weight between two modules, e.g., module 110(1) and 110(2) is a combination of weights of various factors related to those two modules. If there are k factors, for example, then the weight, e.g., weigh $w_{12}$, is calculated based on the formula $f_1w_1+f_2w_2+\ldots f_kw_k$ wherein each weight $w_i$ is associated wi factor, $f_i$ is the weight percentage of a factor, and $f_1+f_2+\ldots+f_k=100\%$. For example, three factors, e.g., the number of call counts, the frequency of referenced global variables, and the parameter characteristic, are considered in the weight for two modules 110(1) and 110(2) as $w_1$, $w_2$, and $w_3$, and each factor is assigned a percentage weight of 40%, 35%, and 25%, respectively, then the weight $w_{12}$ for modules 110(1) and 110(2) is 40% $w_1$+35% $w_2$+25% $w_3$.

In an embodiment, the value of each weight $w_i$ is calculated depending on the factors, and is normalized to be in the same range. For example, if the normalized range is 1 to 10; the total number of call counts in the affinity graph is 10,000; and there are 2,000 call counts between modules 110(1) and 110(2), then $w_1$ in the above example is (2,000*10)/20,000=2. Similarly, if the total number of call counts is 5,000 and there are 3,000 call counts, then $w_1$ is (3,000*10)/5,000=6. Embodiments of the invention are not limited to the above examples; various other methods for normalizing the range for every $w_i$ and/or determining $w_i$ are within the scope of the invention.

For further illustration purpose, if weights $w_1$, $w_2$, and $W_3$ are calculated to have a value of 4, 5, and 6, respectively, then the weight $w_{12}$ is 40% (4)+35% (5)+25% (6) =1.6+1.75+1.5=4.85.

The value of $f_i$ and $w_i$ may be determined based on various techniques including, for example, experience, empirical data, heuristics, profile data, etc.

PARTITIONING MODULES BASED ON AFFINITY WEIGHTS

Figure 3:
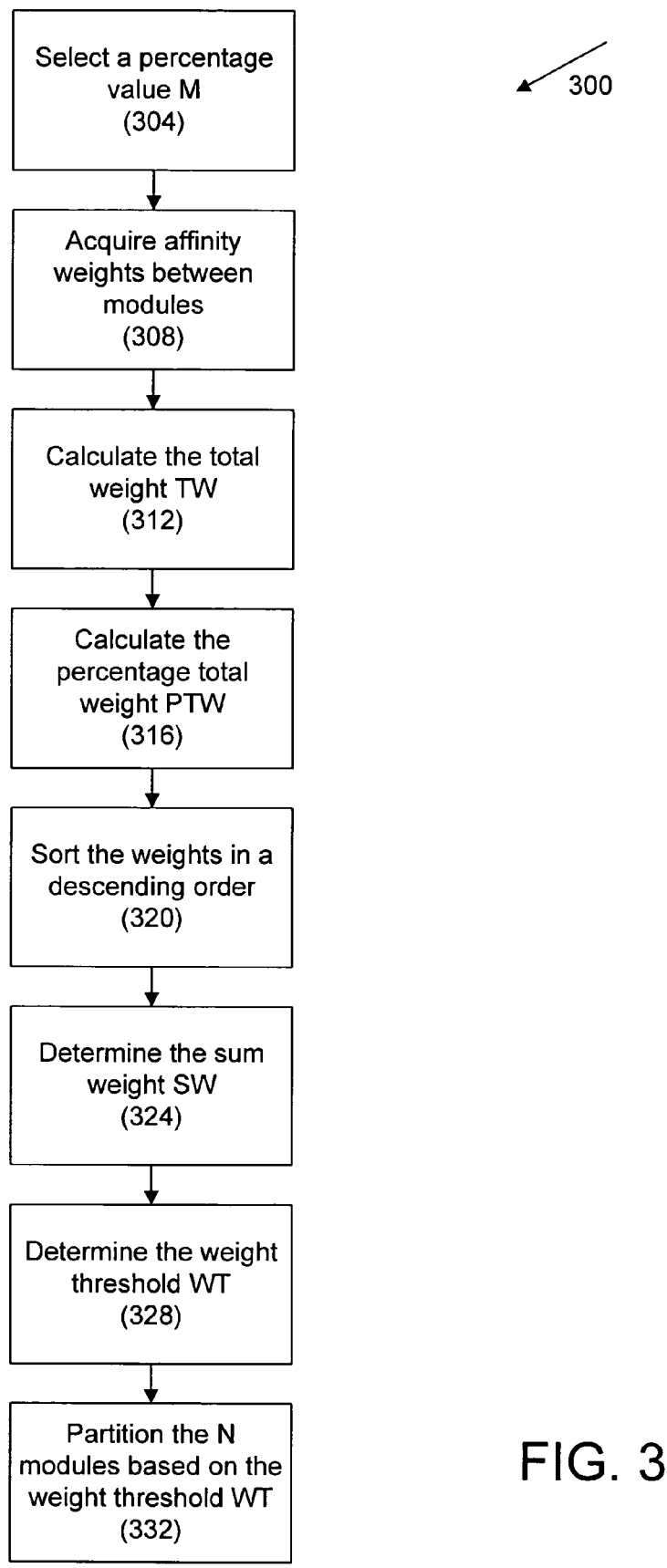
FIG. 3 shows a flowchart illustrating a method embodiment for partitioning exemplary N modules.

FIG. 3 is a flowchart 300 illustrating a method embodiment for partitioning, e.g., N modules, into smaller groups.

In step 304, the method selects a percentage value, e.g., M, which is tunable, e.g., may be varied. In an embodiment, the value of M is calculated as an approximation of the number of modules compiler 120 can handle over the total number of modules in environment 100. The number of modules compiler 120 can handle may be obtained by experiments such as increasing and/or decreasing the number of modules for compiler 120 to compile/optimize those modules until compiling is successful with the maximum number of modules.

In step 308, the method acquires the affinity weights between modules, e.g., using and/or creating the affinity graph based on various factors as described above.

In step 312, the method adds all weights in the graph to form the total weight, e.g., TW.

In step 316, the method multiplies M by the total weight TW to form the percentage of the total weight, e.g., PTW.

In step 320, the method sorts the weights in the graph in a descending order.

In step 324, the method calculates the sum weight by iterating through the list of sorted weights and adding the weights as a sum weight SW until the sum weight SW is greater than PTW.

In step 328, the method selects, as the weight threshold WT, the last weight that was added to SW and that results in sum weight SW being greater than PTW.

In step 332, the method partitions the N modules based on the weight threshold WT.

Figure 4:
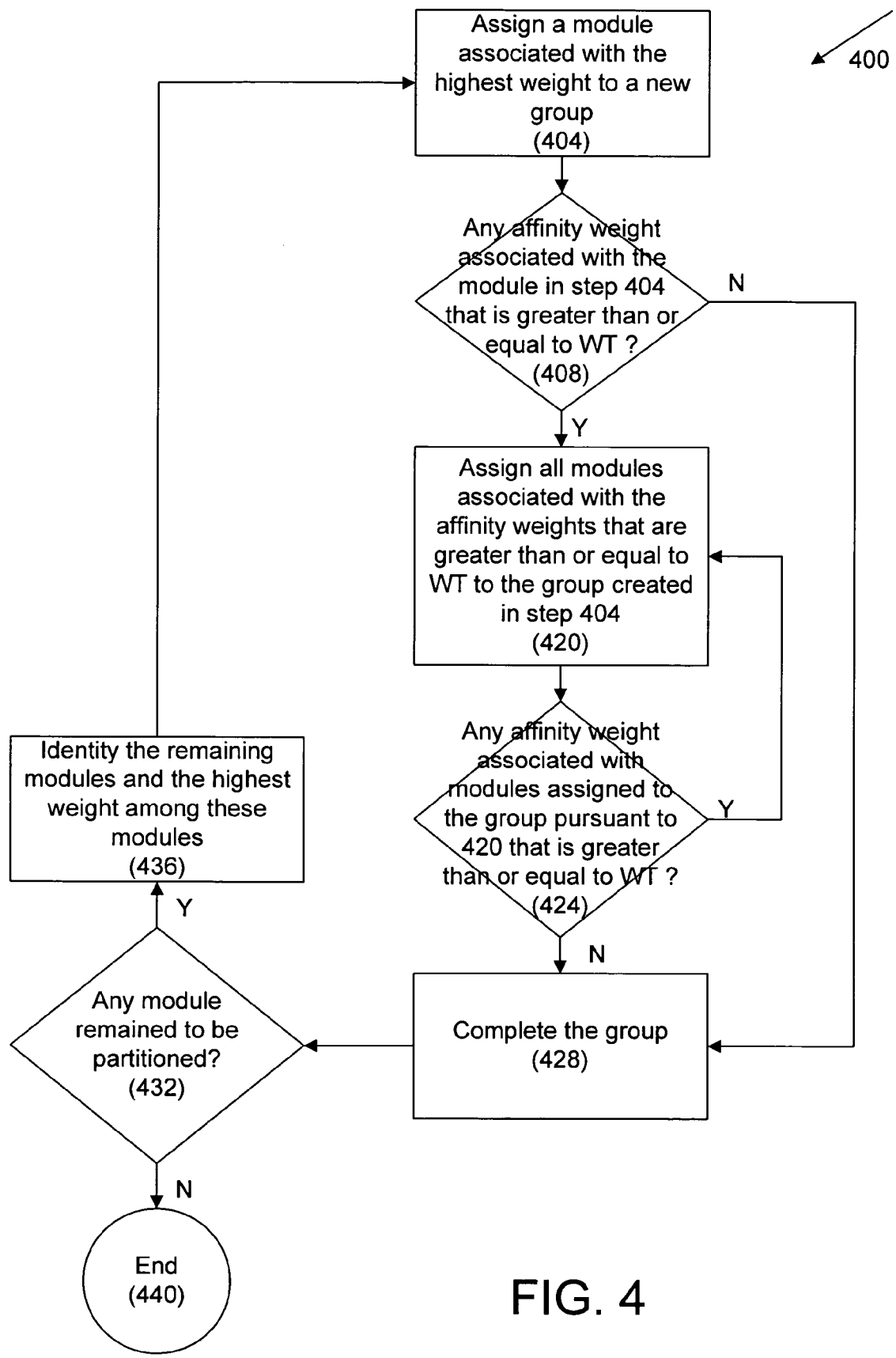
FIG. 4 shows a flowchart illustrating a method used by a step in the flowchart of FIG. 3, in accordance with an embodiment.

FIG. 4 is a flowchart 400 illustrating a method embodiment used in FIG. 3 to partition the N modules in step 332. In step 404, the method identifies a module associated with the highest affinity weight among the modules that have not been assigned to any group, and assigns this module to a newly created group. Those skilled in the art will recognize that when the method begins the first time in step 404, the highest affinity weight among the modules that have not been assigned to any group is the highest affinity weight sorted in step 320.

In step 408, the method determines if there is any affinity weight associated with the module in step 404 that is greater than or equal to the weight threshold WT.

If there is not any such affinity weight, then the method, in step 428, finishes with the group created in step 404, and continues from that step 428. However, if there is at least one affinity weight associated with the identified module in step 404 that is greater than or equal to the threshold weight WT, then the method proceeds to step 420.

In step 420, the method identifies the module(s) associated with all affinity weights that are greater than or equal to the threshold weight WT, and assigns these modules to the same group created in step 404.

In step 424, the method determines if there is any weight associated with the modules assigned to the group pursuant to step 420 that is greater than or equal to the weight threshold WT. If at least one of such weight exists, then the method proceeds to step 420. That is, the method assigns all modules associated with the affinity weight(s) identified in step 424 that are greater than or equal to the weight threshold WT to the group. However, if there is not any of such weight, the method proceeds to step 428 to complete the group.

Once a group is complete in step 428, the method, in step 432, determines if there is any module remained to be partitioned. If there is only one module remained to be partitioned, then the method assigns that one module to a new group, and ends at step 440. However, if there are modules remained to be partitioned, then the method, in step 436, identifies the remained modules and the highest affinity weight among these modules, and restarts a new group in step 404.

In the above methods, the weight threshold WT was compared using the logical relationship "greater than or equal to" to find an affinity weight, and such finding may be referred to as "qualifying" an affinity weight. However, embodiments of the invention are not limited by a particular logical relationship. Other logical relationships such as "greater than," "lesser than," "lesser than or equal to," etc., may also be used. Generally, the relationship "lesser than" or "lesser than or equal to" is used in situations where a lower value of an affinity weight indicates a more closely relationship than a higher value. Similarly, even though the logical relationship "greater than" was used for the percentage of the total weight PTW, other logical relationships are within the scope of embodiments of the invention.

Additionally, the method 300 may be expressed in various different ways, and yet provides the same results. An example may be expressed as:
a) providing a threshold;
b) determining if there are modules remained to be partitioned,
    if there is not, then finishing;
    else proceeding to step c);
c) finding among the modules that have not been assigned to a group a module associated with the highest affinity weight among the affinity weights associated with the modules that have not been assigned to a group, and assigning this module to a new group;
d) for each module in the new group created in step c) that has not been processed,
    identifying the each module as a first module;
    iterating through each module neighboring to the first module; and
    if the neighboring module has not been assigned to a group, and an affinity weight between the neighboring module and the first module is qualified based on the weight threshold, then assigning the neighboring module to the new group; and
e) proceeding to step b)

In the above example, an affinity weight may be qualified by one of the logical relationships with respect to the weight threshold.

FIRST EXAMPLE OF PARTITIONING FIVE MODULES

Figure 5:
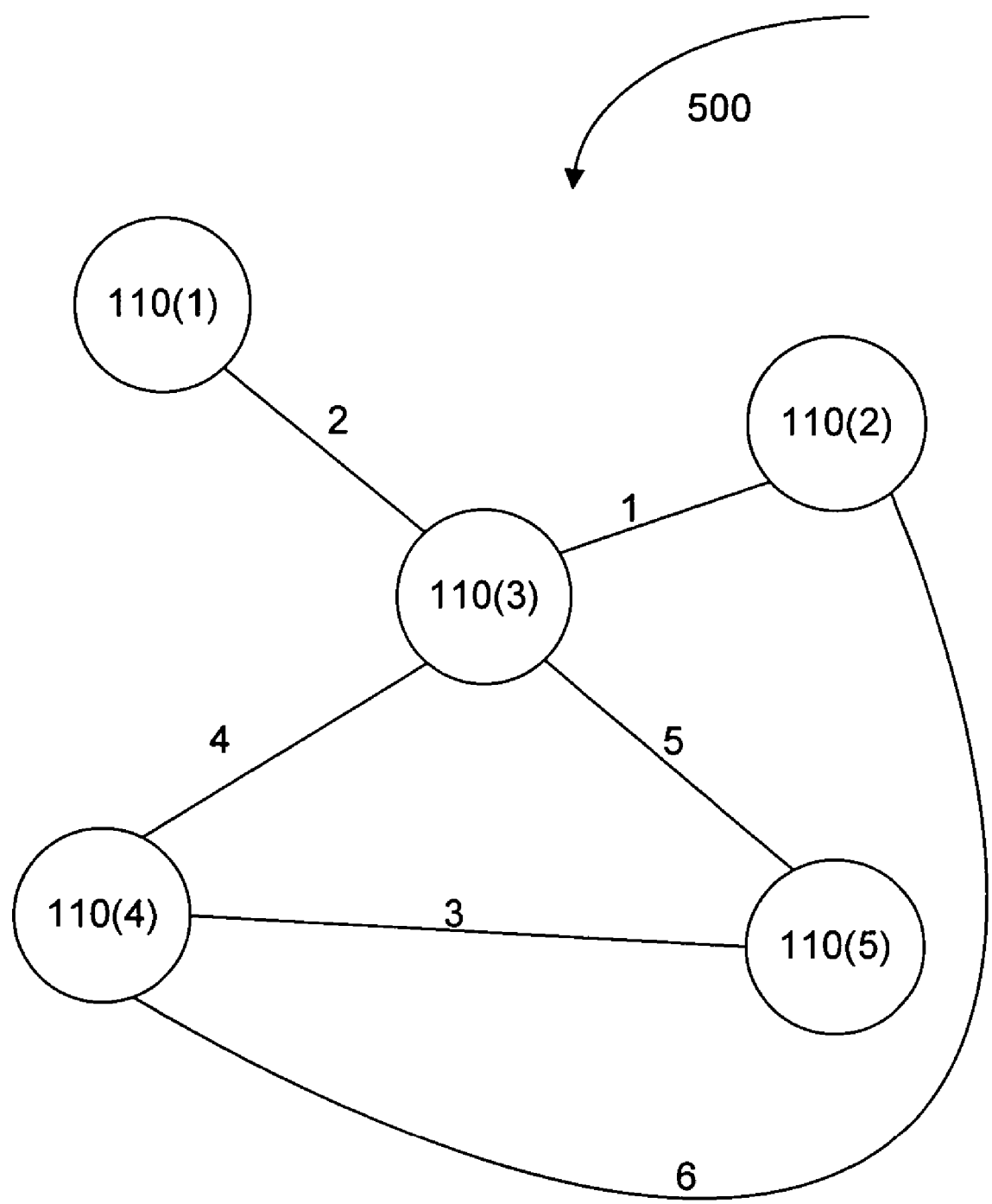
FIG. 5 shows an exemplary affinity graph for five modules, in accordance with an embodiment.

FIG. 5 shows an affinity graph 500 for five modules 110(1), 110(2), 110(3), 110(4), and 110(5). In this graph 500, for illustration purposes, the affinity weights between modules have been identified as follows: 2 between 110(1) and 110(3), 1 between 110(2) and 110(3), 3 between 110(4) and 110(5), 4 between 110(4) and 110(3), 5 between 110(3) and 110(5), and 6 between 110(2) and 110(4).

Figure 6:
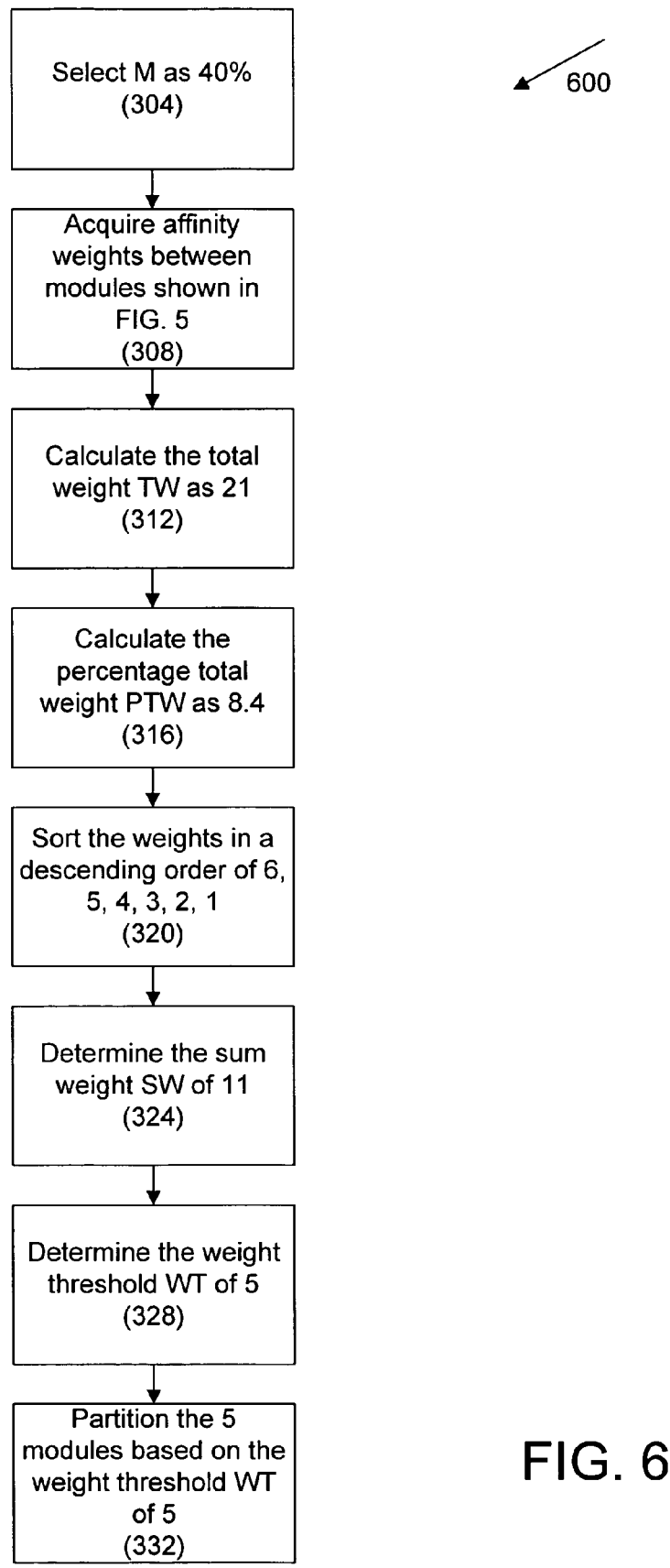
FIG. 6 shows a flowchart illustrating a method embodiment for partitioning five modules having an affinity graph in FIG. 5.

FIG. 6 is a flowchart 600 illustrating a method embodiment for grouping five modules having the affinity graph in FIG. 5. Using the method in FIG. 3 results in the steps in FIG. 6.

In step 304, for illustration purposes, the method selects M as 40%.

In step 308, the method acquires the affinity weights as shown in FIG. 5.

In step 312, the method adds the weights in graph 500, resulting in the total weight TW of 21 (1+5+3+2+4+6).

In step 316, the method calculates the percentage total weight PTW as 8.4 (40%* 21).

In step 320, the method sorts the weights in graph 500 in an ascending order as 6, 5, 4, 3, 2, 1.

In step 324, the method calculates the sum weight SW using the sorted weights in step 320. Initially, because the first and highest weight 6 is not greater than PTW of 8.4, the method adds the next highest weight, which is 5, to 6, resulting in a sum weight SW of 11, which is greater than the percentage PTW of 8.1.

In step 328, because 5 is the last weight added to sum weight SW that results in a sum weight SW of 11 being greater than the percentage total weight PTW of 8.4, the method selects 5 as weight threshold WT.

In step 332, the method partitions the five modules using the weight threshold 5 selected in step 328.

Figure 7:
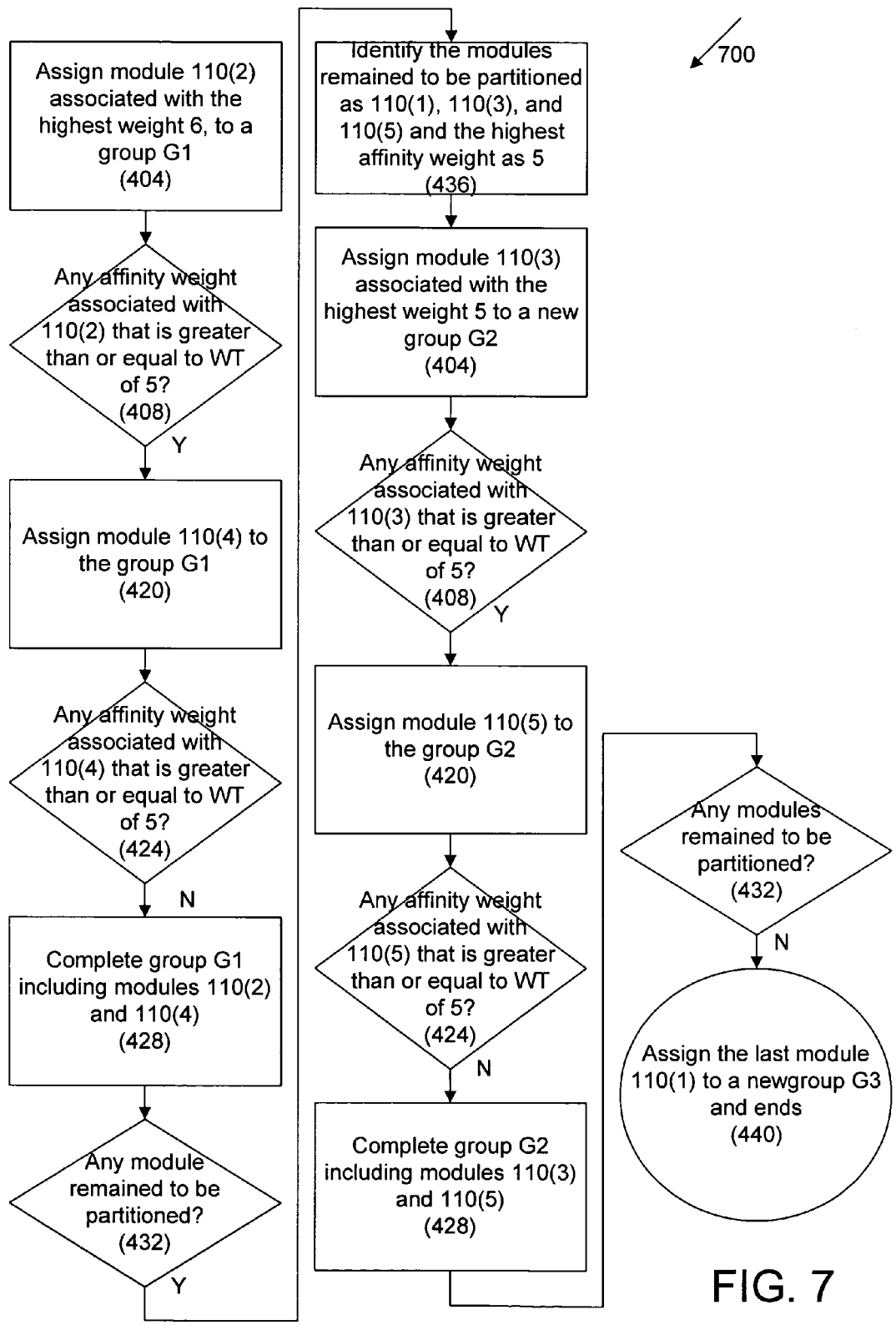
FIG. 7 shows a method used in a step in the flowchart of FIG. 6.

FIG. 7 is a flowchart 700 illustrating a method embodiment used in step 332. Using the method 400 in FIG. 4 results in the steps in FIG. 7.

In step 404, because the highest affinity weight 6 corresponds to modules 110(2) and 110(4), the method assigns either modules 110(2) or 110(4) to a new group, e.g., group G1. For illustration purposes, the method assigns module 110(2) to the group G1. However, those skilled in the art will recognize that the partitioning result remains the same even if the method first assigns module 110(4), instead of module 110(2), to group G1.

In step 408, the method determines if there is any affinity weight associated with module 110(2) that is greater than or equal to the weight threshold WT of 5. Because the affinity weight 6 is greater than the weight threshold WT, the method proceeds to step 420.

In step 420, the method assigns module 110(4) to group G1 because the affinity weight between modules 110(2) and 110(4) is 6, which is greater than the weight threshold WT of 5.

In step 424, the method determines if there is any affinity weight associated with module 110(4) that is greater than or equal to the weight threshold of 5, and because there is not any of such affinity weight, the method, in step 428, completes group G1 that includes modules 110(2) and 110(4).

In step 432, the method determines if there are modules remained to be partitioned. Because there are modules remained to be partitioned, the method, in step 436, identifies those modules as 110(1), 110(3), and 110(5), and the highest affinity weight among those modules as 5.

The method then returns to step 404, and, for illustration purposes, assigns module 110(3) associated with the highest affinity weight 5, to group a new group, e.g., group G2. Alternatively, the method may assign module 110(5), instead of module 110(3), to group G2 and proceeds accordingly.

In step 408, the method determines if there is any affinity weight associated with module 110(3) that is greater than or equal to the weight threshold WT 5. Because the affinity weight 5 between 110(3) and 110(5) exists, the method proceeds to step 420 in which the method assigns module 110(5) to the same group G2.

In step 424, the method determines if there is any affinity weight associated with module 110(5) that is greater than or equal to the weight threshold of 5. Because there is not any of such affinity weight, the method, in step 428, completes group G2 including modules 110(3) and 110(5).

In step 432, the method determines if there are modules remained to be partitioned. Because 110(1) is the only module left, the method assigns module 110(1) to a new group, e.g., group G3, and ends in step 440.

SECOND EXAMPLE OF PARTITIONING FIVE MODULES

Figure 8:
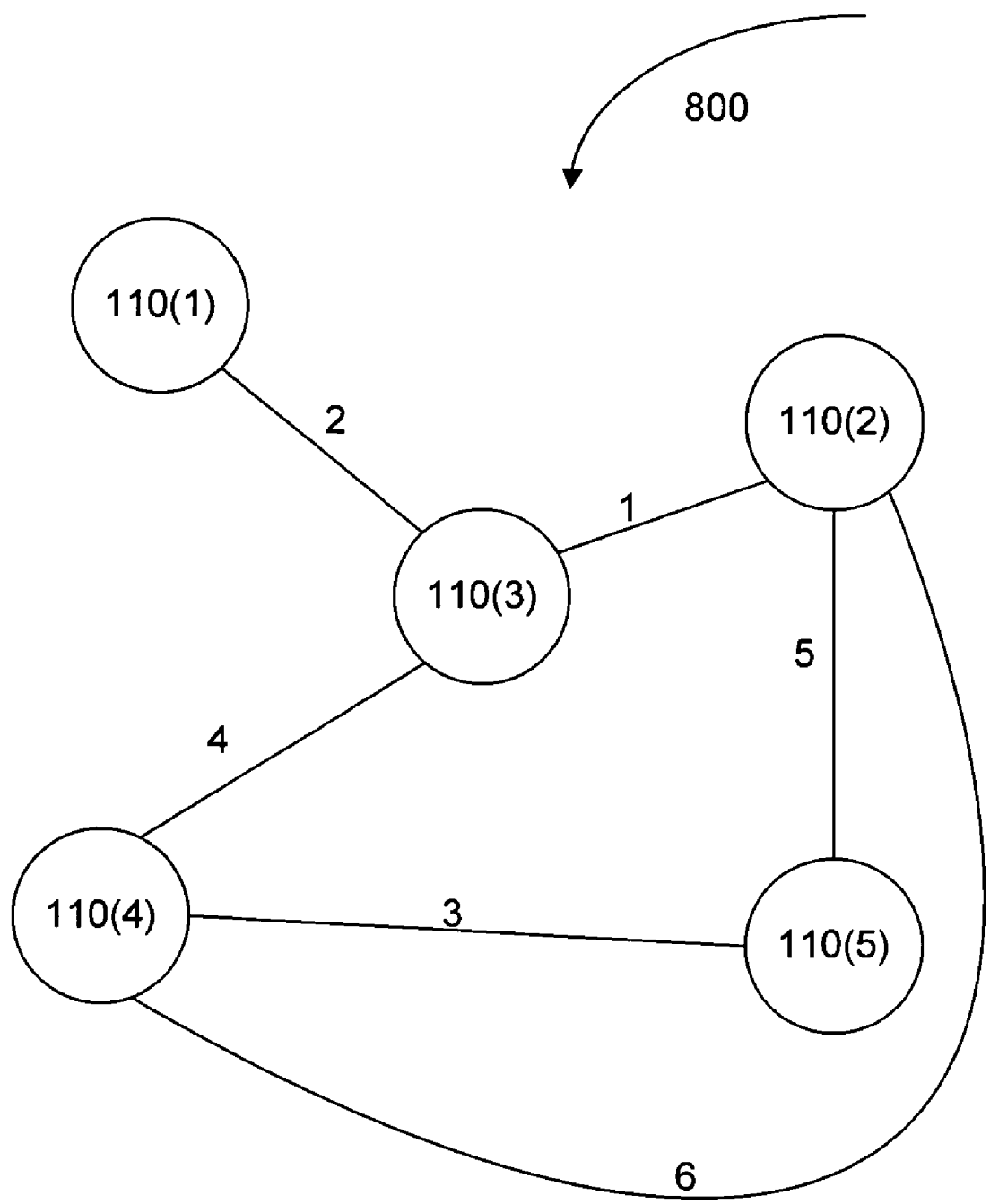
FIG. 8 shows another exemplary affinity graph for another illustration of partitioning five modules, in accordance with an embodiment.

FIG. 8 shows an affinity graph 800 for another illustration of partitioning five modules, in accordance with an embodiment. Graph 800 has the same number of modules and affinity weights as in graph 500. However, the affinity weight 5 is between modules 110(2) and 110(5), instead of being between modules 110(5) and 110(3) as in graph 500.

Figure 9:
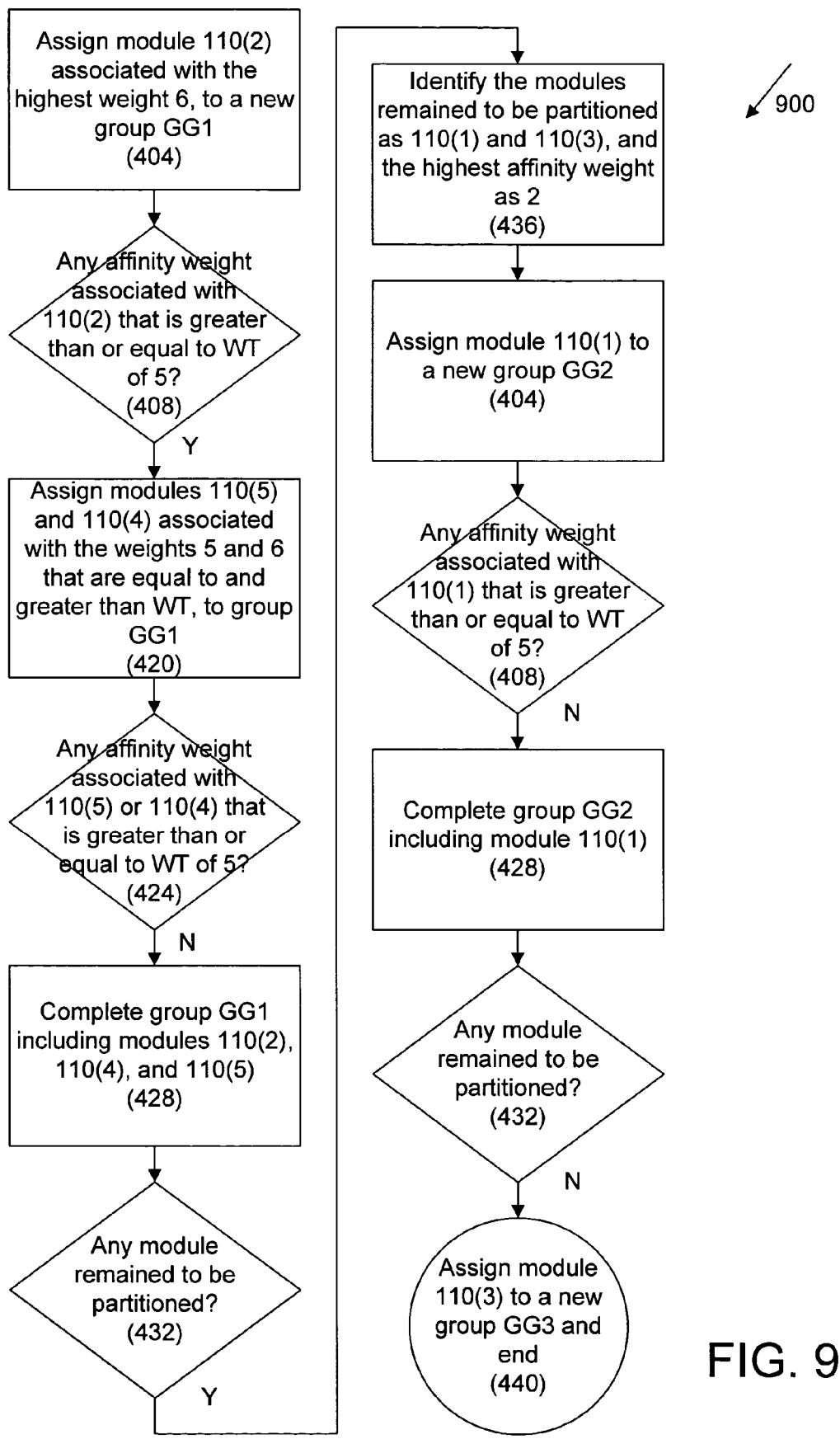
FIG. 9 shows a flowchart illustrating a method embodiment for partitioning the five modules having the affinity graph of FIG. 8.

Because the affinity weights of graph 800 and graph 500 are the same, using the method in FIG. 3 or FIG. 6 results in the weight threshold WT of 5. FIG. 9 is a flowchart 900 illustrating a method embodiment for partitioning the five modules 110(1) to 110(5) having the affinity graph in FIG. 8. Using the method 400 results in the method 900.

In step 404, because the highest weight 6 corresponds to modules 110(2) and 110(4), the method may assign either module 110(2) or 110(4) to a new group, e.g., group GG1. For illustration purposes, the method assigns module 110(2) to the group GG1, In step 408, the method determines if there is any affinity weight associated with module 110(2) that is greater than or equal to the weight threshold 5.

Because there are affinity weights 5 and 6 that are equal to and greater than the weight threshold WT of 5, the method, in step 420, identifies modules 110(5) and 110(4) associated with these affinity weights, and thus assigns these modules to group GG1.

In step 424, the method determines if there is any weight associated with module 110(5) or 110(4) that is greater than or equal to the weight threshold 5.

Because there is not any such affinity weight, the method, in step 428, completes group GG1 including modules 110 (2), 110(4), and 110(5).

In step 432, the method determines if there are modules remained to be partitioned. Because there are two modules 110(1) and 110(3), the method, in step 436, identifies these two modules and the highest weight between these two modules as 2.

In step 404, the method may assign either module 110(1) or 110(3) to a new group, e.g., group GG2. For illustration purposes, the method assigns module 110(1) to group GG2.

In step 408, the method determines if there is any affinity weight associated with module 110(1) that is greater than or equal to the weight threshold of 5. Because there is no such affinity weight, the method proceeds to step 428 to complete group GG2.

In step 432, the method determines if there are modules remained to be partitioned. Because, module 110(3) is the only one left, the method assigns this module to group a new group, e.g., GG3, and ends in step 440.

COMPUTER SYSTEM OVERVIEW

Figure 10:
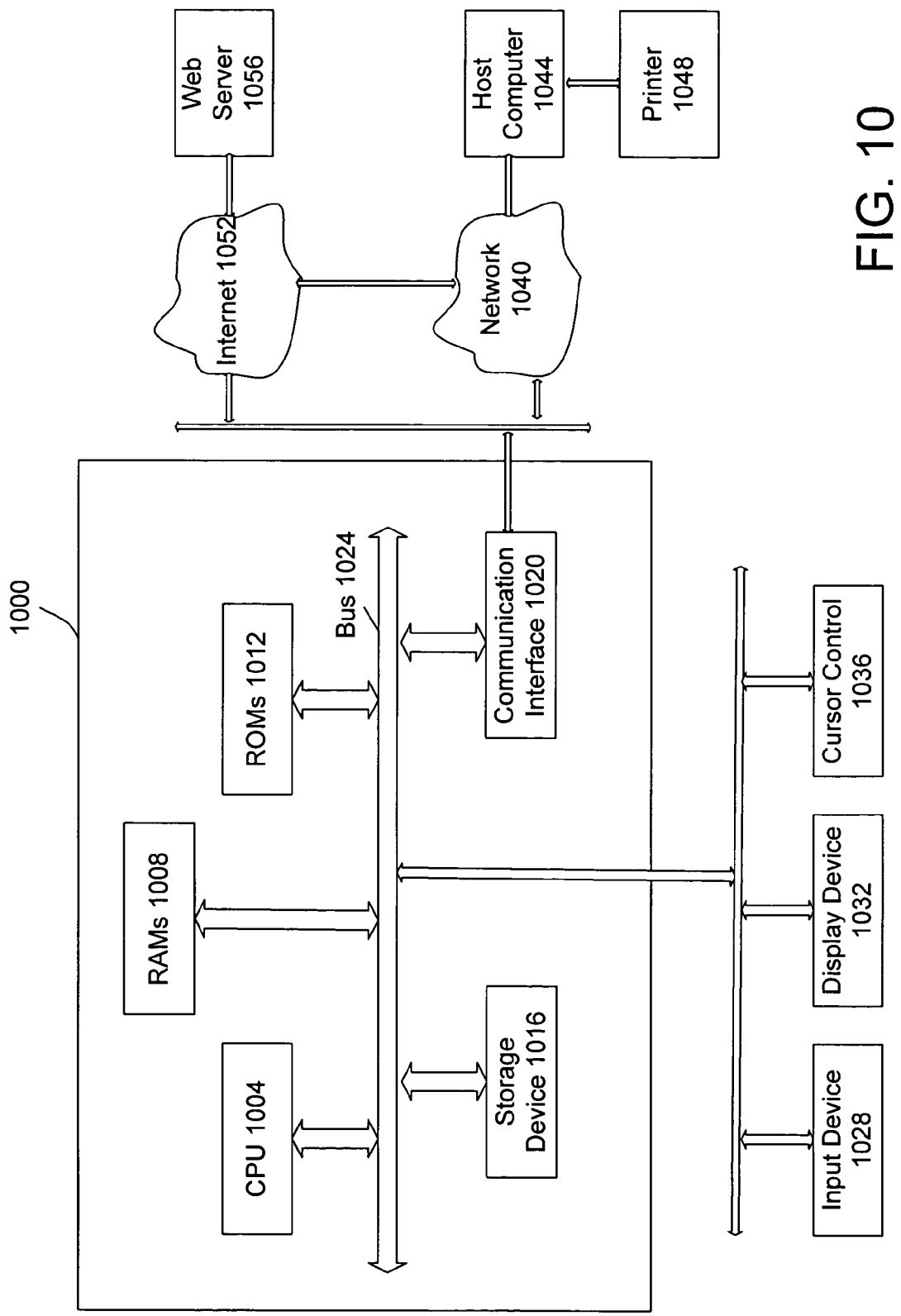
FIG. 10 shows an overview of a computer system in accordance with an embodiment, for use with various embodiments of the invention.

FIG. 10 is a block diagram showing a computer system 1000 upon which embodiments of the invention may be implemented. For example, computer system 1000 may be implemented to execute environment 100, to perform tasks in accordance with the techniques, the method embodiments, etc., described above, etc. In an embodiment, computer system 1000 includes a central processing unit (CPU) 1004, random access memories (RAMs) 1008, read-only memories (ROMs) 1012, a storage device 1016, and a communication interface 1020, all of which are connected to a bus 1024.

CPU 1004 controls logic, processes information, and coordinates activities within computer system 1000. In an embodiment, CPU 1004 executes instructions stored in RAMs 1008 and ROMs 1012, by, for example, coordinating the movement of data from input device 1028 to display device 1032. CPU 1004 may include one or a plurality of processors.

RAMs 1008, usually being referred to as main memory, temporarily store information and instructions to be executed by CPU 1004. Information in RAMs 1008 may be obtained from input device 1028 or generated by CPU 1004 as part of the algorithmic processes required by the instructions that are executed by CPU 1004.

ROMs 1012 store information and instructions that, once written in a ROM chip, are read-only and are not modified or removed. In an embodiment, ROMs 1012 store commands for configurations and initial operations of computer system 1000.

Storage device 1016, such as floppy disks, disk drives, or tape drives, durably stores information for use by computer system 1000.

Communication interface 1020 enables computer system 1000 to interface with other computers or devices. Communication interface 1020 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 1020 may also allow wireless communications.

Bus 1024 can be any communication mechanism for communicating information for use by computer system 1000. In the example of FIG. 10, bus 1024 is a media for transferring data between CPU 1004, RAMs 1008, ROMs 1012, storage device 1016, communication interface 1020, etc.

Computer system 1000 is typically coupled to an input device 1028, a display device 1032, and a cursor control 1036. Input device 1028, such as a keyboard including alphanumeric and other keys, communicates information and commands to CPU 1004. Display device 1032, such as a cathode ray tube (CRT), displays information to users of computer system 1000. Cursor control 1036, such as a mouse, a trackball, or cursor direction keys, communicates direction information and commands to CPU 1004 and controls cursor movement on display device 1032.

Computer system 1000 may communicate with other computers or devices through one or more networks. For example, computer system 1000, using communication interface 1020, communicates through a network 1040 to another computer 1044 connected to a printer 1048, or through the world wide web 1052 to a server 1056. The world wide web 1052 is commonly referred to as the "Internet." Alternatively, computer system 1000 may access the Internet 1052 via network 1040.

Computer system 1000 may be used to implement the techniques described above. In various embodiments, CPU 1004 performs the steps of the techniques by executing instructions brought to RAMs 1008. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 1004 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 1004 are in the form of one or more software programs and are initially stored in a CD-ROM being interfaced with computer system 1000 via bus 1024. Computer system 1000 loads these instructions in RAMs 1008, executes some instructions, and sends some instructions via communication interface 1020, a modem, and a telephone line to a network, e.g. network 1040, the Internet 1052, etc. A remote computer, receiving data through a network cable, executes the received instructions and sends the data to computer system 1000 to be stored in storage device 1016.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for providing an affinity weight between two modules for use in partitioning modules, comprising:
    determining k factors; k being an integer number; each factor representing a distinct relationship between the two modules; and
    providing a sum of $f_i w_i$ as the affinity weight; the subscript i running k times;
        wherein each $w_i$ is associated with a factor;
        each $w_i$ is a weight factor of a factor; and
        a sum of $f_i$ being equal to 100%.

2. The method of claim 1 wherein the relationship between the two modules is based on one or a combination of:
    a number of calls across the two modules;
    a possibility for in-lining a function in a module of the two modules;
    a characteristic of a call graph of functions in the two modules;
    a frequency of a global variable referenced in the two modules;
    a characteristic of a parameter passed between functions in the two modules;
    a possibility for de-virtualizing a virtual function in a module of the two modules.

3. A method for partitioning program modules, comprising:
    providing affinity weights among the modules; wherein a relationship between two modules constitutes an affinity weight for those two modules;
    based on the affinity weights among the modules, providing a weight threshold; and
        assigning a first module associated with an affinity weight that indicates the first module is most closely related to a second module; and
    qualifying affinity weights that are associated with the first module, by comparing these affinity weights to the weight threshold; and assigning, to the group, all modules that are associated with the affinity weights qualified in the qualifying step, wherein an affinity weight for two modules of the program modules is provided by a formula $f_1w_1+f_2w_2+\ldots f_kw_k$, each weight $w_i$ being associated with a factor indicating a relationship between the two modules, and each $f_i$ is a weight percentage of the factor.

4. The method of claim 1 wherein an affinity weight in the step of qualifying is qualified based on one or a combination of the following logical relationship with the weight threshold: equal to, greater than.

5. The method of claim 1 further comprising the steps of:
   a) qualifying affinity weights that are associated with the modules assigned to the group by the step of assigning, by comparing these affinity weights to the threshold; and
   b) assigning, to the group, all modules associated with the affinity weights qualified in step a).

6. The method of claim 1 wherein an affinity weight for two modules of the program modules is provided based on one or more optimization opportunities between the two modules.

7. The method of claim 1 wherein the relationship between the two modules is based on one or a combination of:
   a number of calls across the two modules;
   a possibility for in-lining a function in a module of the two modules;
   a characteristic of a call graph of functions in the two modules;
   a frequency of a global variable referenced in the two modules;
   a characteristic of a parameter passed between functions in the two modules;
   a possibility for de-virtualizing a virtual function in a module of the two modules.

8. The method of claim 1 wherein the weight threshold is calculated using a total value of the affinity weights among the modules.

9. The method of claim 8 wherein the weight threshold is calculated using a percentage value.

10. The method of claim 9 wherein the percentage value is derived from the capability of a compiler to handle a number of modules.

11. The method of claim 1 being implemented as program instructions embodied in a computer-readable medium.

12. A method for partitioning modules, comprising:
   a) providing a weight threshold;
   b) determining if there are modules remained to be partitioned,
      if there is not, then stopping the method;
      else proceeding to step c);
   c) finding among the modules that have not been assigned to a group a module associated with the highest affinity weight among the affinity weights associated with the modules that have not been assigned to a group, and assigning this module to a new group;
   d) for each module in the new group created in step c) that has not been processed,
      identifying the each module as a first module;
      iterating through each module neighboring to the first module;
         wherein a first module neighboring to a second module if the first module and the second module is related by an affinity weight wherein an affinity weight for two modules of the modules is provided by a formula $f_1w_1+f_2w_2+\ldots f_kw_k$, each weight $w_1$ being associated with a factor indicating a relationship, between the two modules, and each $f_i$ is a weight percentage of the factor;
         if the neighboring module has not been assigned to a group,
            and an affinity weight between the neighboring module and the first module is qualified based on the weight threshold, then assigning the neighboring module to the new group; and
   e) proceeding to step b).

13. The method of claim 12 wherein the affinity weight between the neighboring module and the first module is further qualified based on one or a combination of the following logical relationship: lesser than, equal to, greater than.

14. The method of claim 12 being implemented as program instructions embodied in a computer-readable medium.

15. A computer-readable medium embodying program instructions for performing a method for partitioning program modules, the method comprising:
   a) providing affinity weights among the modules; wherein a relationship between two modules constitutes an affinity weight for those two modules wherein an affinity weight for two modules of the program modules is provided by a formula $f_1w_1+f_2w_2+\ldots f_kw_k$, each weight $w_i$ being associated with a factor indicating a relationship, between the two modules, and each $f_i$ is a weight percentage of the factor;
   b) based on the affinity weights among the modules, providing a weight threshold; and
      assigning a first module associated with an affinity weight that indicates the first module is most closely related to a second module; and
   c) qualifying affinity weights that are associated with the first module, by comparing these affinity weights to the weight threshold; and
   d) assigning, to the group, all modules that are associated with the affinity weights qualified in step c);
   e) qualifying affinity weights that are associated with all modules assigned to the group by step d), by comparing these affinity weights to the threshold; and
   f) assigning, to the group, all modules associated with the affinity weights qualified in step e).

* * * * *

UNITED STATES PATENT AND TRADEMARK OFFICE
CERTIFICATE OF CORRECTION

PATENT NO. : 7,165,162 B2 Page 1 of 1
APPLICATION NO. : 10/756881
DATED : January 16, 2007
INVENTOR(S) : XinLiang David Li et al.

It is certified that error appears in the above-identified patent and that said Letters Patent is hereby corrected as shown below:

In column 12, line 11, in Claim 12, delete "$w_1$" and insert -- $w_i$ --, therefor.

In column 12, line 12, in Claim 12, after "relationship" delete ",".

In column 12, line 37, in Claim 15, delete "$f_i w_i$" and insert -- $f_1 w_1$ --, therefor.

In column 12, line 39, in Claim 15, after "relationship" delete ",".

Signed and Sealed this

Fourth Day of August, 2009

JOHN DOLL
*Acting Director of the United States Patent and Trademark Office*